United States Patent [19]

Kusunose et al.

[11] 4,083,894
[45] Apr. 11, 1978

[54] POLYAMIDE PREPARED IN THE PRESENCE OF SULFOPOLYESTER

[75] Inventors: Tetsuhiro Kusunose; Masataka Ideka; Kazuyuki Kitamura; Tsukasa Shima; Hiroshi Henmi, all of Nobeoka, Japan

[73] Assignee: Asahi Kasei Kogyo Kabushiki Kaisha, Osaka, Japan

[21] Appl. No.: 536,695

[22] Filed: Dec. 26, 1974

[30] Foreign Application Priority Data

Dec. 26, 1973 Japan .................. 48-143937

[51] Int. Cl.$^2$ .............................................. C08L 77/00
[52] U.S. Cl. .......................... 260/857 PE; 8/178 R; 8/179; 260/30.8 R; 260/75 N; 260/75 S; 260/78 R; 260/78 A; 260/78 L; 260/78 S
[58] Field of Search ............. 260/75 S, 78 R, 857 PE, 260/75 N

[56] References Cited

U.S. PATENT DOCUMENTS

| | | | |
|---|---|---|---|
| 3,734,874 | 5/1973 | Kibler et al. | 260/75 S |
| 3,779,993 | 12/1973 | Kibler et al. | 260/75 S |
| 3,899,470 | 8/1975 | McGee et al. | 260/75 S |
| 3,900,527 | 8/1975 | King et al. | 260/75 S |

*Primary Examiner*—Harold D. Anderson
*Attorney, Agent, or Firm*—Sughrue, Rothwell, Mion, Zinn and Macpeak

[57] ABSTRACT

A process for preparing polyamides which comprises polymerizing a polyamide-forming compound selected from the group consisting of ω-aminocarboxylic acids, ω-lactams and an equimolar mixture of a diamine and a dicarboxylic acid and modifying the polyamide formed in the polymerization by incorporating at least one compound of the formula (I)

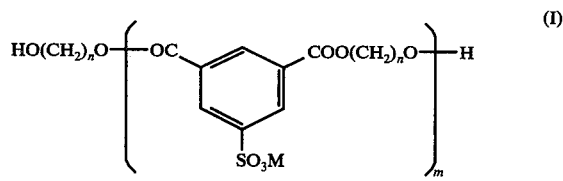

wherein M represents an alkali metal or an alkaline earth metal; $n$ is an integer of 2 to 4; and $m$ is an integer of 2 or more; before, during or after the polymerization.

30 Claims, 1 Drawing Figure

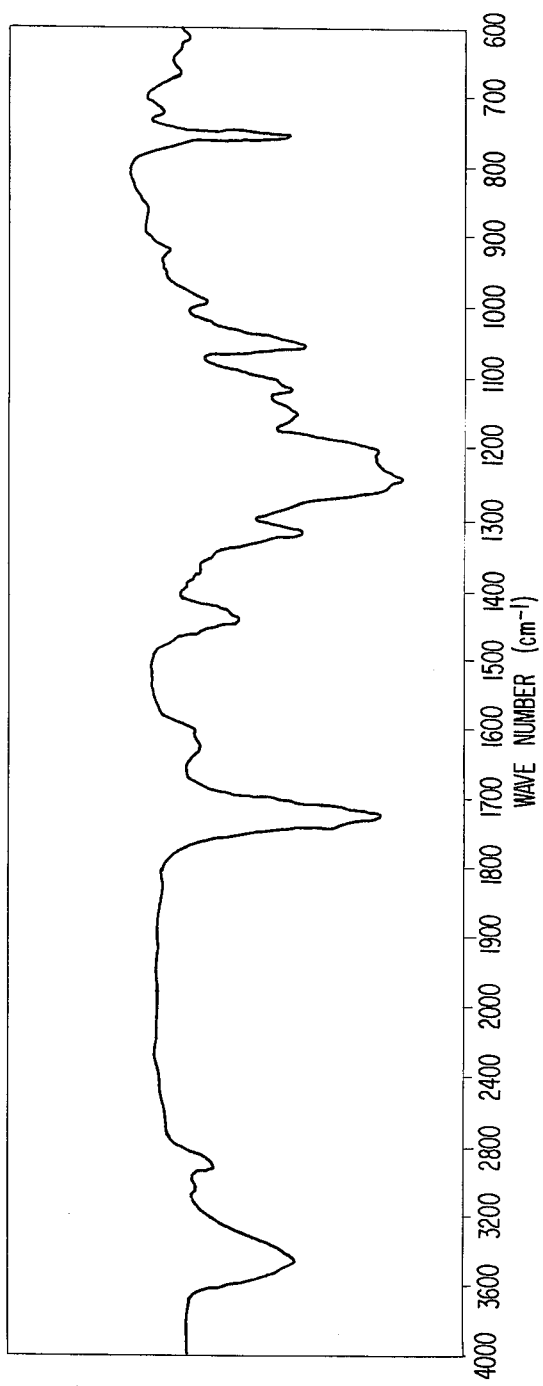

POLYAMIDE PREPARED IN THE PRESENCE OF SULFOPOLYESTER

BACKGROUND OF THE INVENTION

1. Field of the Invention

This invention relates to a process for preparing improved polyamides. More particularly, this invention relates to a process for preparing polyamides useful for the formation of films, fibers and other articles and having an improved receptivity or affinity for basic dyestuffs.

2. Description of the Prior Art

Polyamides have been generally prepared by the ring-opening polymerization of ω-lactams, or the polycondensation of ω-aminocarboxylic acids or diaminodicarboxylates (hereinafter the polymerization reaction and the polycondensation reaction will be designated polymerization for simplicity), and the need for films, fibers and other articles prepared from polyamides have steadily been increased because of their excellent tensile strength and good hand and dye-receptivity or affinity for disperse dyes or acid dyes.

However, one of the disadvantages of polyamides is that these polyamides generally do not possess receptivity or affinity for basic dyes. Recently, polyamides of a high receptivity or affinity for basic dyes having brilliant colors and high dye-ability have been wanted and a method for introducing sulfonate groups into the polymer chain of polyamides has been proposed. For example, U.S. Pat. Nos. 3,039,990 and 3,142,662 disclose compounds having the formulas (II) and (III)

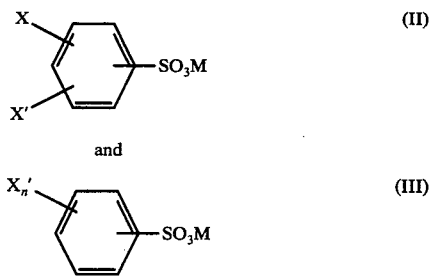

wherein M is an alkali metal, X and X' are —COOH, —R'COOH, —COOR", —R'COOR" or —R'NH$_2$ in which R' represents an alkylene group having 1 to 5 carbon atoms and R" represents an alkyl group having 1 to 5 carbon atoms, and n' is an integer of from 1 to 2. However, when the above compounds are used in the polymerization of polyamides, they are generally bonded to the main chain of a polyamide molecule or the terminal of a polyamide molecule in view of the chemical structure of these compounds and, therefore, a relatively large amount of the compounds should be copolymerized in order to obtain sufficient affinity for basic dyes. Thus, the resulting polyamides using a large amount of these compounds of the formula (II) or (III) generally have a low degree of polymerization and exhibit poor spinnability, especially, poor formation of yarns thereby reducing the fiber properties such as tensile strength and elongation property. These disadvantages ultimately adversely affect the quality of articles produced from such polyamides. Also, when a polyamide-forming compound, for example, a diamine or a dicarboxylic acid is used in a controlled amount by considering the amount of the amido-forming groups in the compound having the formula (II) above, the degree of polymerization in the resulting polyamides can be increased to some extent, but the polyamides obtained in such a case tend to be stained by acid dyes because such polyamides generally contain an approximately equal number of terminal amino groups and carboxyl groups. Further, when these compounds are incorporated into polyamides, the resulting polyamides exhibit an increase in their melt viscosity as a result of the property of the sulfonic acid ion and thus the yield of the polyamide recovered from the polymerization vessel and the handling operability of the polyamides are markedly decreased. In addition, the increase in the melt viscosity adversely affects the spinning yield in the melt spinning of the polyamides, the properties of the resulting fibers, etc.

SUMMARY OF THE INVENTION

A primary object of this invention is to provide a process for preparing polyamides having an improved receptivity or affinity for basic dyestuffs.

Another object of this invention is to provide a process for preparing polyamides using an additive containing an alkali metal or an alkaline earth metal sulfonate group, —SO$_3$M, wherein M is as defined above, which when melted per se show a high melt viscosity but, when the above additive is incorporated into polyamides, in contrast an increase in the melt viscosity of the resulting polyamides is rather prevented.

A further object of this invention is to provide a process for preparing polyamides where the amount of polymer remaining in the polymerization vessel after the resulting polyamides have been recovered from the vessel can be minimized.

A still further object of this invention is to provide a polyamide having an improved receptivity or affinity for basic dyes without adversely affecting the spinning yield of the fibers and fiber properties such as tensile strength, elongation, etc.

As a result of various studies on improvements in a process for preparing a polyamide having excellent receptivity or affinity for basic dyes and yet providing a polyamide whose fiber properties such as spinnability, tensile strength, elongation and the like were affected to a lesser extent, it was found that polyamides which satisfy the above requirements can be obtained by the process according to the present invention.

That is, the present invention provides a process for preparing polyamides which comprises polymerizing a polyamide-forming compound selected from the group consisting of ω-aminocarboxylic acids, ω-lactams and an equimolar mixture of a diamine and a dicarboxylic acid and modifying the polyamides formed in the polymerization by incorporating at least one compound of the formula (I)

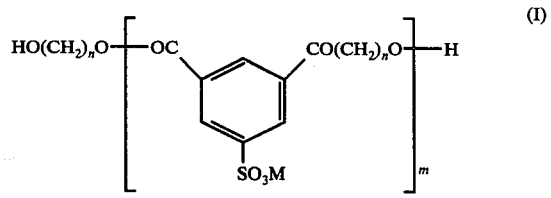

wherein M represents an alkali metal or an alkaline earth metal; n is an integer of 2 to 4; and m is an integer of 2 or more; before, during or after the polymerization.

BRIEF DESCRIPTION OF THE ACCOMPANYING DRAWING

The FIGURE is an infrared absorption spectrum of polyethylene 5-sodium sulfoisophthalate obtained in Example 1 of the present invention.

DETAILED DESCRIPTION OF THE INVENTION

In the process of this invention, the above compound of the formula (I) can be incorporated into the polymerization reaction system of the polyamide-forming compound at any stage of the polycondensation but before forming the resulting polyamides into fibers, films or other articles. For example, the compound of the formula (I) can be present in the polymerization reaction system prior to the initiation of the polymerization or during or after the polymerization.

In the general formula (I) suitable examples of M are alkali metals such as lithium, sodium, potassium and rubidium and alkaline earth metals such as calcium, barium and strontium. As described above $m$ is an integer of 2 or more, e.g., 2 to about 50, preferably 2 to 20, most preferably 5 to 15.

Suitable examples of the polyamide-forming compounds which can be used in the present invention include ω-aminocarboxylic acids represented by the formula (IV)

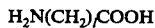  (IV)

wherein $l$ is an integer of from 3 to 16, for example, ε-aminocaproic acid, 11-aminoundecanoic acid and the like; ω-lactams represented by the formula (V)

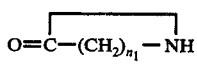  (V)

wherein $n_1$ is an integer of from 3 to 11, for example, ε-caprolactam, ω-caprinlactam, ω-laurinlactam and the like; and an equimolar mixture of a diamine of the formula (VI)

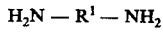  (VI)

wherein $R^1$ represents an alkylene group having 2 or more carbon atoms, e.g., 2 to about 12 carbon atoms, an arylene group having 6 or more carbon atoms, e.g., 6 to about 12 carbon atoms, or an aralkylene group having 8 or more carbon atoms, e.g., 8 to about 12 carbon atoms, for example, hexamethylenediamine, nonamethylenediamine, m-xylylenediamine and the like, and a dicarboxylic acid of the formula (VII)

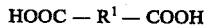  (VII)

wherein $R^1$ is as defined above, for example, adipic acid, sebacic acid, isophthalic acid, terephthalic acid and the like.

The compound of the formula (I) used in the present invention can be prepared by esterification or transesterification of the compound of the formula (VIII)

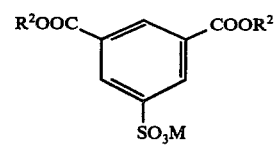  (VIII)

wherein M is as defined above and $R^2$ represents a hydrogen atom or a lower alkyl group having 1 to 5 carbon atoms, and a compound of the formula (IX)

  (IX)

wherein $n$ represents an integer of from 2 to 4, followed by polymerization of the reaction product. Specific examples of compounds of the formula (VIII) are

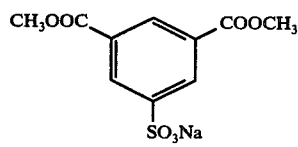

and the corresponding potassium, calcium and barium salts thereof and the corresponding ethyl and propyl esters thereof. Examples of compounds of the formula (IX) are ethylene glycol, propylene glycol, and butylene glycol.

The esterification or transesterification can be carried out according to conventional techniques. That is, the esterification or transesterification can be carried out at a temperature of about 160° to 210° C in the presence or absence of an appropriate amount of a catalyst.

Further, the polymerization reaction of the above reaction product can also be carried out according to the conventional techniques. That is, the polymerization reaction can be carried out at a temperature of about 220° to 250° C under reduced pressure in the presence or absence of an appropriate amount of a catalyst.

Representative compounds having the above formula (I) which can be used in the present invention are given below, but the present invention is not limited only to the use of these specific compounds.

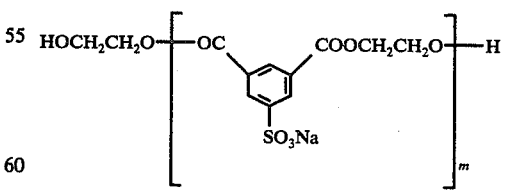

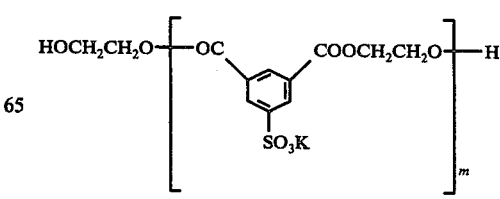

-continued

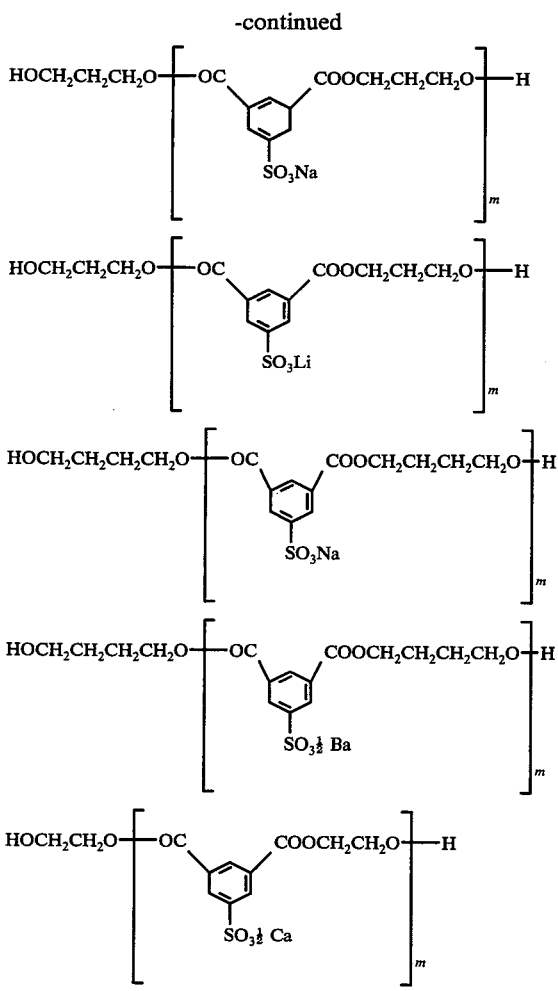

wherein m is an integer as defined hereinbefore.

The compounds represented by the formula (I) above are preferably those having a degree of polymerization less than about 20 ($m = 20$ or less). The compounds of the formula (I) wherein m represents 20 or more can also be used for the purposes contemplated in the present invention, but the melt viscosity of the compound markedly increased due to the effect of —SO$_3$M groups in the preparation of the compound thereby lowering the yield of the compound when it is removed from the reaction vessel used in the preparation of the compound. On the other hand, when the compound wherein m is 1 is used in the polymerization of polyamide-forming compounds, an expansion of the reaction system occurs in the polyamide polymerization vessel thereby causing problems in the stability of the polyamide quality and in the production of polyamides on an industrial scale.

The compound having the formula (I) above can be incorporated into the polymerization system in a proportion of from about 0.1 to about 5 mole%, preferably 0.3 to 3 mole%, based on the sulfonate group content of the compound of the formula (I) per polyamide recurring unit. In a proportion less than about 0.1 mole% per polyamide recurring unit, the resulting polyamide does not possess sufficient receptivity or affinity for basic dyes and, in a proportion higher than about 5 mole%, no additional effects over those obtainable using about 5 mole% can be realized and, rather, the physical properties of the polyamides obtained tend to be deteriorated.

Generally, polyamides can be prepared by the dehydration-condensation of an ω-aminocarboxylic acid or an equimolar mixture of a diamine and a dicarboxylic acid at a temperature above the melting point of the polyamides produced, or by the polymerization of lactams in the presence of an appropriate reaction initiator such as water at a temperature above the melting point of the polyamides produced. Alternatively, the above polymerization can proceed by heating polyamides having a low degree of polymerization at a temperature below the melting point of the polyamides whereby polyamides having a high degree of polymerization can be produced.

As set forth previously, polyamides having improved properties according to the present invention can be obtained by incorporating at least one compound represented by the formula (I) above into a polymerization reaction system for the preparation of polyamides prior to the initiation of the polymerization or during the polymerization and thereafter completing the polymerization, or after completion of the polymerization but prior to subjecting the resulting polyamides to subsequent moldings into fibers, films or other articles. The polymerization of polyamide-forming compounds and the moldings of the polyamides can be accomplished in a usual manner which is well-established in the art as described in U.S. Pat. Nos. 3,039,990, 3,142,662, etc., e.g., by heating the polyamide-forming compound at a temperature of from about 180° C to 300° C, preferably 200° to 295° C, until a sufficiently high degree of polymerization to produce fibers, films, molded articles is obtained. The polymerizing can be conducted at subatmospheric pressures, atmospheric pressures and superatmospheric pressures and preferably in an inert atmosphere.

The improved polyamides or the molded articles produced therefrom can contain additives which are commonly used in conventional polyamides. Such additives include, for example, photo-stabilizers such as manganese hypophosphite, manganese lactate and the like, heat-stabilizers such as phenylphosphonic acid, hexamethyl phosphoryltriamide and the like, thickening agents, viscosity-stabilizing agents such as acetic acid, propionic acid, benzoic acid, monoaminophenol and the like, terminal-group blocking agents, anti-gloss agents such as titanium dioxide and the like.

In the Examples and the Comparative Examples hereinafter described, various properties and results were determined using the followig procedures.

The sulfuric acid relative viscosity "$\eta r$" was determined with an Ostwald viscometer using a 1.0% solution of a polyamide in 95.5% sulfuric acid as a test sample. The $\eta r$ value is calculated by dividing the falling time of the sample by the falling time of the solvent (95.5% sulfuric acid).

The melt viscosity "$\eta m$" was determined in Shimazu Type Flow Tester Model 301 (produced by Shimazu Seisakusho Ltd.). The determination was carried out by melting, at a temperature of 290° C, a polyamide chip which had been dried at 70° C for 24 hours under reduced pressure, and the melt viscosity is expressed in poises.

The chip yield was determined by dividing the amount of chips actually obtained by the theoretical amount of chips. The lower is the value, the larger is the amount of chips remaining unrecovered in the polymerization tank used for the polycondensation.

The spinning yield designates the number of spindles which could be wound without breaking of the yarn relative to the total number of spindles wound when the melt spun fibers are stretched, twisted and wound as a 3 kg pirn.

The dye adsorption was determined by the following procedure using a basic dye, Cathilon Blue 5 GH (trade name, produced by Hodogaya Chemical Co., Ltd.). A 1 g sample of the polyamide fibers was dyed in a dye bath having a dye concentration of 1% o.w.f., a pH of 4 and a bath ratio of 1:100 at a temperature of 100° C for 1 hour. The sample was determined from the bath, and the absorbance of the dye bath was determined using a Hirama Type photoelectric colorimeter at a wavelength of 610 m$\mu$.

The present invention is further illustrated by the following Examples and Reference Examples, but it is to be noted that these Examples are given for the purposes of illustration only and the present invention is not to be construed as being limited to these examples. Unless otherwise indicated, all parts, percents, ratios and the like are by weight.

EXAMPLE 1

(a) Preparation of Polyethylene 5-Sodium Sulfoisophthalate 100 parts of dimethyl 5-sodium sulfoisophthalate and 110 parts of ethylene glycol were charged into a reaction vessel, and the mixture was kept at a temperature of 197° C for 5 hours under a nitrogen stream to effect the transesterification reaction while distilling off most of the methanol formed. The temperature of the reaction mixture was then increased to 230° C, and any excess of ethylene glycol was distilled off under reduced pressure. The mixture was then polymerized under a reduced pressure of 1.5 mmHg at a temperature of 240° C for 2 hours. The resulting polymer was white in color and had a melting point of 236° C.

The average degree of polymerization of the resulting polymer was determined using the following procedure. That is, 5 ml of an acetylation reagent consisting of acetic anhydride and pyridine (1:3 by volume) was added to 1 g of the resulting polymer, and the mixture was heated on a steam bath for 45 minutes. The resulting sample solution was poured into 10 ml of water and, after allowing the mixture to cool, 10 ml of n-butanol was added thereto. After addition of an indicator (a mixture of a 0.1% aqueous solution of cresol red and a 0.1% aqueous solution of thymol blue, 1:3 by volume), the mixture was titrated with a standard 0.5N ethanolic sodium hydroxide solution. The degree of polymerization (Pn) was calculated using the following equation (I).

$$Pn = \frac{4 \times S}{M \times (V_1 - V_2)} \quad (I)$$

wherein:
S designates the weight of the sample (mg).
M designates the molecular weight of the polyester recurring unit.
$V_2$ designates the amount of the 0.5N ethanolic sodium hydroxide solution required for the titration of the test sample (ml).
$V_1$ designates the amount of the 0.5N ethanolic sodium hydroxide solution required for the titration of a blank sample.

The degree of polymerization obtained in this example was found to be 13 as determined using the above equation (I). The infrared absorption spectrum of the resulting polymer as determined using the potassium bromide tablet method is shown in the Figure.

(b) Polymerization and Results of Spinning and Dyeing 116 parts of hexamethylene diammoniumadipate, 73 parts of water and 2.0 parts of polyethylene 5-sodium sulfoisophthalate having a sulfonate group content of 1.5 mole % per polyamide recurring unit were charged into an autoclave, and the temperature of the mixture was gradually increased from 230° C to 280° C over a period of 1.5 hours while maintaining the mixture under a nitrogen atmosphere at a pressure of 17.5 kg/cm². The pressure was then reduced to atmospheric pressure while maintaining the temperature at 280° C, and the reaction mixture was kept under a nitrogen stream for an additional one hour to complete the polymerization. The resulting polymer was found to have a chip yield of 91.4%, an $\eta r$ of 2.52 and an $\eta m$ of 375.

The resulting polymer was then melt spun at a temperature of 294° C and the spun fibers were drawn to a draw ratio of 3.5. The spinning yield of the spun fibers was found to be 98.5% and the fibers had a tensile strength of 4.43 g/d and an elongation of 34.5%.

The fibers obtained above exhibited a dye absorption of 98.5%.

Also, the above fibers did not exhibit any absorption of an acid dye after the fibers were dyed in a dye bath containing 1% o.w.f. of Cathilon Blue 5GH as a basic dye and 1% o.w.f. of Supracene yellow GR (trade name, produced by Bayer Co.) as an acid dye at a bath ratio of 1:100, at a pH of 4 and at a temperature of 100° C for one hour.

REFERENCE EXAMPLE 1

116 parts of hexamethylene diammonium adipate, 73 parts of water and 0.15 parts of acetic acid as a viscosity-stabilizing agent were polymerized in the same manner as described in Example 1 to obtain a polymer having a chip yield of 91.5%, an $\eta r$ of 2.51 and an $\eta m$ 377.

The resulting polymer was then spun and subsequently drawn in the same manner as described in Example 1. The spinning yield of the spun fibers was 98.0%. The dye absorption of the fibers with respect to Cathilon Blue 5 GH was found to be 10.1%.

REFERENCE EXAMPLE 2

2.4 parts (2.0 mole%) of 5-sodium sulfoisophthalic acid was added to 116 parts of hexamethylene diammoniumadipate and 73 parts of water, and the mixture was polymerized in the same manner as described in Example 1 to obtain a polymer having a chip yield of 80.7% and a $\eta r$ of 2.15.

The resulting polymer was then spun and subsequently drawn in the same manner as described in Example 1. The spinning yield of the spun fibers was 80.5%. The spun fibers thus obtained had a tensile strength of 3.22 g/d, an elongation of 26.3% and a dye absorption of 97.0% with respect to Cathilon Blue 5 GH.

REFERENCE EXAMPLE 3

A polymer was prepared in the same manner as described in Example 1 but using 116 parts of hexamethylene diammoniumadipate, 1.78 parts (1.5 mole%) of 5-sodium sulfoisophthalic acid, 0.36 parts of hexamethylenediamine as a viscosity-increasing agent and 73 parts of water. The resulting polymer had a chip yield of 82.7%, an $\eta r$ of 2.52 and an $\mu m$ of 543.

The resulting polymer was then spun and subsequently drawn in the same manner as described in Example 1, and the spinning yield of the spun fibers was 83.2%. The spun fibers had a tensile strength of 3.72 g/d, an elongation of 28.8% and a dye absorption of 94.5% with respect to Cathilon Blue 5 GH.

EXAMPLE 2

100 parts of dimethyl 5-sodium sulfoisophthalate and 120 parts of trimethylene glycol were charged into a reaction vessel, and the mixture was kept at a temperature of 212° C for 6 hours under a nitrogen stream to effect the transesterification reaction. The mixture was then polymerized in the same manner as described in Example 1 to obtain a polymer having a degree of polymerization of 14.

2.1 parts (1.5 mole%) of the above polymer was then added to 100 parts of the chip obtained in Reference Example 1, and the mixture was melt spun at a temperature of 300° C. The resulting spun fibers were drawn to a draw ratio of 3.5, and the spinning yield of the spun fibers was 96.5%. The fibers thus obtained had a tensile strength of 4.38 g/d, an elongation of 33.7% and a dye absorption of 97.7% with respect to Cathilon Blue 5 GH and did not exhibit any stain with an acidic dye.

EXAMPLE 3

200 parts of dimethyl 5-potassium sulfoisophthalate and 110 parts of 1,4-butanediol were charged into a reaction vessel, and the mixture was kept at a temperature of 230° C for 8 hours under a nitrogen stream to effect the transesterification reaction. Any excess of 1,4-butanediol was then distilled off, and the reaction mixture was polymerized under a reduced pressure of 1.5 mmHg at a temperature of 240° C for 20 minutes to obtain a polymer having a degree of polymerization of 2.

97 parts of ε-caprolactam, 4.9 parts (1.5 mole%) of the above polymer and 3 parts of water were charged into an autoclave and, after the autoclave was purged with nitrogen gas, the mixture was polymerized in the sealed autoclave at a temperature of 260° C for 4 hours. Thereafter, the pressure in the autoclave was released and the polymerization mixture was further polymerized while introducing nitrogen gas into the autoclave for 20 hours. The resulting polymer had a chip yield of 90.8% and an $\eta r$ of 2.48.

The resulting polymer was then spun and drawn to a draw ratio of 3.5, and spinning yield of the spun fibers was 97.0%. The spun fibers exhibited a dye absorption of 98.3% with respect to Cathilon Blue 5 GH and did not exhibit any strain with an acid dye.

EXAMPLE 4

(A) Preparation of Polyethylene 5-Calcium Sulfoisophthalate.

100 parts of dimethyl 5-calcium sulfoisophthalate and 110 parts of ethylene glycol were charged into a reaction vessel, and the mixture was kept at a temperature of 197° C for 5 hours under a nitrogen stream to effect the transesterification reaction while distilling off most of the methanol formed. The temperature of the reaction mixture was then increased to 230° C, and any excess of ethylene glycol was distilled off under reduced pressure. The mixture was then polymerized under a reduced presssure of 1.5 mmHg at a temperature of 240° C for 2.5 hours. The resulting polymer was white in color and had a melting point of 240° C. Further, the degree of polymerization of the polymer was 20.

(B) Polymerization and Results of Spinning and Dyeing.

97 parts of ε-caprolactam and 3 parts of water were then charged into an autoclave and, after the autoclave was purged with nitrogen gas, the mixture was polymerized in the sealed autoclave at a temperature of 260° C for 4 hours. Thereafter, the pressure in the autoclave was released, and 3.7 parts (1.5 mole%) of the above polymer was then added thereto and the polymerization mixture was further polymerized while introducing nitrogen gas into the autoclave for 20 hours. The resulting polymer had a chip yield of 90.5% and an $\eta r$ of 2.45.

The resulting polymer was then spun and drawn to a draw ratio of 3.5, and the spinning yield of the spun fibers was 95.8%. The spun fibers exhibited a dye absorption of 98.0% with respect to Cathilon Blue 5 GH.

EXAMPLE 5

100 parts of dimethyl 5-barium sulfoisophthalate and 120 parts of ethylene glycol were charged into a reaction vessel, and the mixture was kept at a temperature of 230° C for 8 hours under a nitrogen stream to effect the transesterification reaction.

Subsequently, the same polymerization reaction was described in Example 1 was carried out to obtain a polymer having a degree of polymerization of 12.

116 parts of hexamethylene diammonium dodecanate, 2.2 parts (1.9 mole%) of the above polymer and 73 parts of water were then added, followed by allowing the mixture to react in the same manner as described in Example 1. Thus, a polymer having a chip yield of 90.8% and an $\eta r$ of 2.49 was obtained.

The resulting polymer was then spun at a temperature of 260° C and drawn to a draw ratio of 3.5, and the spinning yield of the spun fibers was 97%. The spun fibers exhibited a dye absorption of 97.8% with respect to Cathilon Blue 5 GH.

EXAMPLE 6

100 parts of 11-aminoundecanoic acid, 2.2 parts (1.5 mole%) of polyethylene 5-sodium sulfoisophthalate obtained in Example 1 and 3 parts of water were mixed, followed by polymerizating in the same manner as described in Example 1. Thus, a polymer having a chip yield of 91% and an $\eta r$ of 2.47 was obtained.

The resulting polymer was then spun at a temperature of 250° C and drawn to a draw ratio of 3.5, and the spinning yield of the spun fibers was 95%. The spun fibers exhibited a dye absorption of 98.0% with respect to Cathilon Blue 5 GH.

EXAMPLE 7

93 parts of hexamethylene diammonium adipate, 23 parts of hexamethylene diammonium terephthalate, 2.2 parts (1.6 mole%) of polyethylene 5-sodium sulfoisophthalate obtained in Example 1 and 73 parts of water were mixed, followed by polymerization in the same manner as described in Example 1. Thus, a polymer having a chip yield of 91% and an ηr of 2.55 was obtained.

The resulting polymer was then spun and drawn in the same manner as described in Example 1, and the spinning yield of the resulting spun fibers was 96%. The spun fibers exhibited a dye absorption of 98.3% with respect to Cathilon Blue 5 GH.

As is apparent from the results shown in the foregoing Examples and Reference Examples, the process of this invention enables the production of a polymer having a lower melt viscosity than the polymer produced by the conventional procedure in which an alkali metal 3,5-dicarboxybenzene sulfonate or an alkali metal 3,5-dicarboalkoxybenzene sulfonate is incorporated into a polymerization system, thereby reducing the polymer content remaining in the polymerization vessel as compared with the conventional procedure. Further, the process according to the present invention provides polyamides having an improved receptivity or affinity for basic dyes as well as excellent spinning yield, tensile strength and elongation.

While the invention has been described in detail and with reference to specific embodiments thereof, it will be apparent to one skilled in the art that various changes and modifications can be made therein without departing from the spirit and scope thereof.

What is claimed is:

1. In a process for preparing a polyamide useful for the formation of films and fibers by the polymerization of
   (a) an ω-aminocarboxylic acid;
   (b) an ω-lactam; or
   (c) an equimolar mixture of a diamine and a dicarboxylic acid, the improvement which comprises modifying the polyamide formed in the polymerization by incorporating before said polymerization at least one compound of the formula (I)

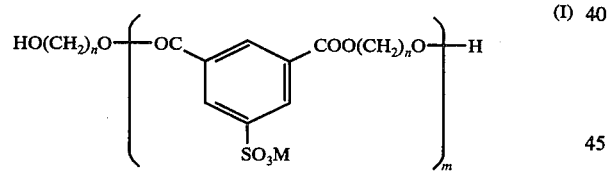

wherein M represents an alkali metal or an alkaline earth metal; n is an integer of 2 to 4; and m is an integer of 2 to about 50; and wherein said compound of the Formula (I) is used in an amount of about 0.1 to about 5 mole % of the sulfonate-containing group in said compound of the Formula (I) per recurring unit of the resulting polyamide.

2. The process according to claim 1, wherein said alkali metal or alkaline earth metal is sodium, potassium, lithium, rubidium, calcium, barium or strontium.

3. The process according to claim 1, wherein m is an integer of from 2 to 20.

4. The process according to claim 3 wherein m is an integer of from 5 to 15.

5. The process according to claim 1, wherein said diamine has the Formula (VI)

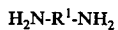   (VI)

wherein R$^1$ represents an alkylene group having 2 to about 12 carbon atoms.

6. The process according to claim 5, wherein said diamine is hexamethylene diamine or nonamethylenediamine.

7. The process according to claim 1, wherein said diamine has the Formula (VI)

   (VI)

wherein R$^1$ represents an arylene group having 6 to about 12 carbon atoms.

8. The process according to claim 1, wherein said diamine has the Formula (VI)

   (VI)

wherein R$^1$ represents an aralkylene group having 8 to about 12 carbon atoms.

9. The process according to claim 8, wherein said diamine is m-xylylenediamine.

10. The process according to claim 1, wherein said dicarboxylic acid is selected from the group consisting of adipic acid, sebacic acid, isophthalic acid and terephthalic acid.

11. The process according to claim 1, wherein said compound of the Formula (I) is selected from the group consisting of

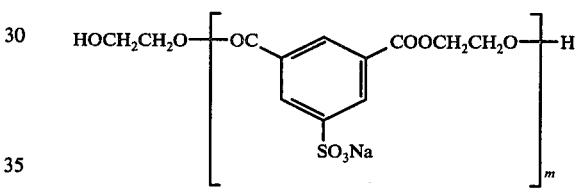

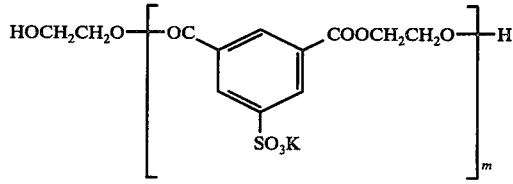

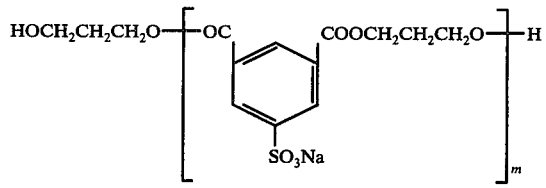

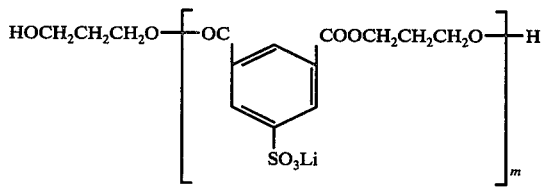

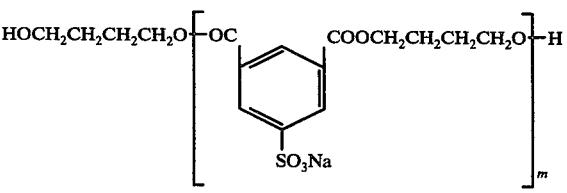

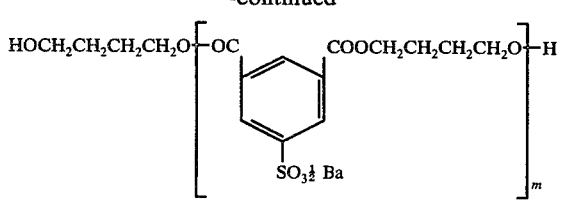

and

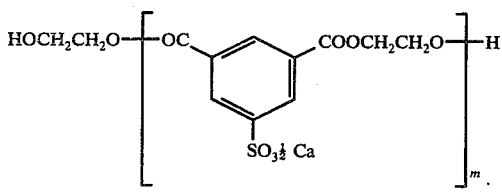

12. The process according to claim 1, wherein said polyamide is prepared by the polymerization of (a).

13. The process according to claim 1, wherein said polyamide is prepared by the polymerization of (b).

14. The process according to claim 1, wherein said polyamide is prepared by the polymerization of (c).

15. A polyamide obtained in accordance with the process of claim 1, wherein said polymerization is of reactants consisting essentially of said component (a), (b) or (c) and said improvement consists essentially of said modifying.

16. In a process for preparing a polyamide for the formation of films and fibers by the polymerization of
(a) an ω-aminocarboxylic acid;
(b) an ω-lactam; or
(c) an equimolar mixture of a diamine and a dicarboxylic acid, the improvement which comprises modifying the polyamide formed in the polymerization by incorporating during said polymerization at least one compound of the Formula (I)

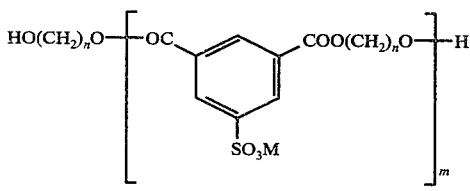

wherein M represents and alkali metal or an alkaline earth metal; $n$ is an integer of 2 to 4; and $m$ is an integer of 2 to about 50; and wherein said compound of the Formula (I) is used in an amount of about 0.1 to about 5 mole % of the sulfonate-containing group in said compound of the Formula (I) per recurring unit of the resulting polyamide.

17. The process according to claim 16, wherein said alkali metal or alkaline earth metal is sodium, potassium, lithium, rubidium, calcium, barium or strontium.

18. The process according to claim 16, wherein $m$ is an integer of from 2 to 20.

19. The process according to claim 16, wherein said diamine has the Formula (VI)

$$H_2N-R^1-NH_2 \qquad (VI)$$

wherein $R^1$ represents an alkylene group having 2 to about 12 carbon atoms.

20. The process according to claim 19, wherein said diamine is hexamethylene diamine or nonamethylenediamine.

21. The process according to claim 16, wherein said diamine has the Formula (VI);

$$H_2N-R^1-NH_2 \qquad (VI)$$

wherein $R^1$ represents an arylene group having 6 to about 12 carbon atoms.

22. The process according to claim 16, wherein said diamine has the Formula (VI)

$$H_2N-R^1-NH_2 \qquad (VI)$$

wherein $R^1$ represents an aralkylene group having 8 to about 12 carbom atoms.

23. The process according to claim 22, wherein said diamine is m-xylylenediamine.

24. The process according to claim 16, wherein said dicarboxylic acid is selected from the group consisting of adipic acid, sebacic acid, isophthalic acid and terephthalic acid.

25. The process according to claim 16, wherein said compound of the Formula (I) is selected from the group consisting of

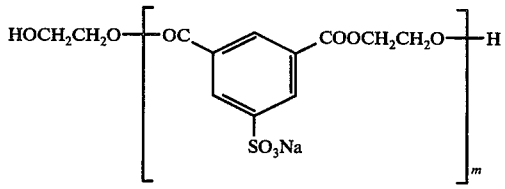

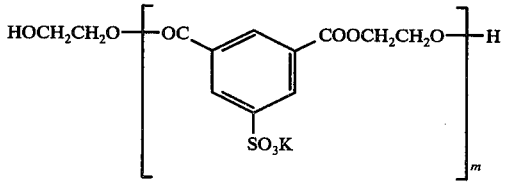

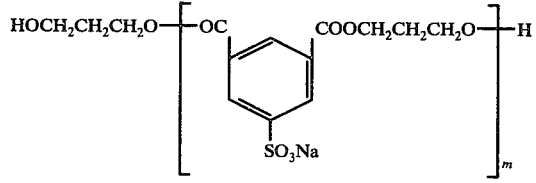

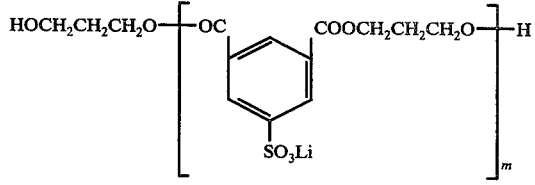

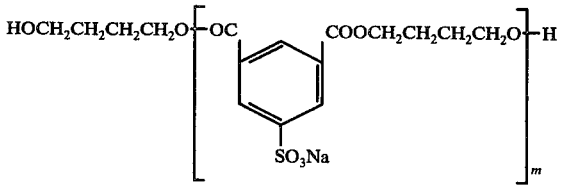

-continued

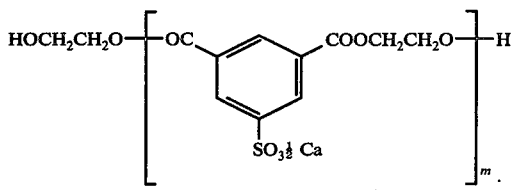

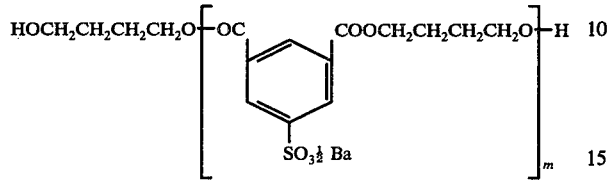

and

26. The process according to claim 16, wherein said polyamide is prepared by the polymerization of (a).

27. The process according to claim 16, wherein said polyamide is prepared by the polymerization of (b).

28. The process according to claim 16, wherein said polyamide is prepared by the polymerization of (c).

29. The process according to claim 18, wherein $m$ is an integer of from 5 to 15.

30. A polyamide obtained in accordance with the process as claimed in claim 16, wherein said polymerization is of reactants consisting essentially of said component (a), (b) or (c) and said improvement consists essentially of said modifying.

* * * * *

UNITED STATES PATENT AND TRADEMARK OFFICE
CERTIFICATE OF CORRECTION

PATENT NO. : 4,083,894
DATED : April 11, 1978
INVENTOR(S) : Tetsuhiro Kusonose et al It is certified that error appears in the above-identified patent and that said Letters Patent are hereby corrected as shown below:

Under INVENTOR:

Correct the spelling of the second inventor's last name to

-- IKEDA --

Signed and Sealed this

Twentieth Day of March 1979

[SEAL]

Attest:

RUTH C. MASON
Attesting Officer

DONALD W. BANNER
Commissioner of Patents and Trademarks